United States Patent
Jacob et al.

(10) Patent No.: US 11,262,227 B2
(45) Date of Patent: Mar. 1, 2022

(54) PITOT TUBE HEATER ASSEMBLY

(71) Applicant: Rosemount Aerospace Inc., Burnsville, MN (US)

(72) Inventors: Robin Jacob, Karnataka (IN); Guru Prasad Mahapatra, Karnataka (IN); Paul Robert Johnson, Prior Lake, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 0 days.

(21) Appl. No.: 16/578,561

(22) Filed: Sep. 23, 2019

(65) Prior Publication Data
US 2020/0109982 A1    Apr. 9, 2020

(30) Foreign Application Priority Data

Oct. 5, 2018 (IN) .............................. 201811037757

(51) Int. Cl.

| | | |
|---|---|---|
| *G01F 15/10* | (2006.01) | |
| *F16L 33/22* | (2006.01) | |
| *G01L 19/04* | (2006.01) | |
| *G01P 5/165* | (2006.01) | |

(52) U.S. Cl.
CPC ............ *G01F 15/10* (2013.01); *F16L 33/223* (2013.01); *G01L 19/04* (2013.01); *G01P 5/165* (2013.01)

(58) Field of Classification Search
None
See application file for complete search history.

(56) References Cited

U.S. PATENT DOCUMENTS

| | | | |
|---|---|---|---|
| 3,364,742 A | 1/1968 | De Leo | |
| 4,611,394 A * | 9/1986 | Gellert | H05B 3/42 29/611 |
| 5,046,360 A * | 9/1991 | Hedberg | G01L 19/0007 73/182 |
| 6,252,210 B1 * | 6/2001 | Schwarzkopf | B29C 45/73 219/535 |
| 7,124,630 B2 | 10/2006 | Hanson et al. | |

(Continued)

FOREIGN PATENT DOCUMENTS

| | | |
|---|---|---|
| EP | 0932831 B1 | 2/2004 |
| EP | 3073275 A2 | 9/2016 |
| EP | 3133403 A1 | 2/2017 |

OTHER PUBLICATIONS

European Search Report for European Application No. 19201456.1, dated Feb. 6, 2020, 7 pages.

*Primary Examiner* — Harshad R Patel
(74) *Attorney, Agent, or Firm* — Cantor Colburn LLP

(57) ABSTRACT

A pitot tube includes an outer tube extending from a first tube end to second tube end. The second tube end defines a tip portion of the pitot tube. A tube sleeve is located inside of the outer tube and defines a tube passage extending from the first tube end to the second tube end. A heating element is located between the outer tube and the tube sleeve. The heating element is isolated from airflow into the tube passage. A method of forming a pitot tube includes installing a heating element to an outer surface of a tube sleeve, the tube sleeve defining a tube passage of the pitot tube. The tube sleeve is secured in an outer tube such that the heating element is between the tube sleeve and the outer tube and is isolated from airflow through the tube passage.

7 Claims, 5 Drawing Sheets

(56) References Cited

U.S. PATENT DOCUMENTS

| | | |
|---|---|---|
| 9,664,542 B2 | 5/2017 | Gordon et al. |
| 9,891,083 B2 | 2/2018 | Gordon et al. |
| 9,976,882 B2 | 5/2018 | Seidel et al. |
| 10,024,877 B2 | 7/2018 | Golly et al. |
| 2003/0010130 A1* | 1/2003 | Bachinski ............... G01P 5/165 73/747 |
| 2004/0093953 A1* | 5/2004 | Gilkison ................. G01P 5/165 73/736 |
| 2010/0116806 A1* | 5/2010 | Hollingsworth ....... B64D 15/12 219/202 |
| 2013/0114946 A1* | 5/2013 | Human .................... H05B 3/78 392/480 |
| 2016/0280391 A1 | 9/2016 | Golly et al. |
| 2016/0291051 A1* | 10/2016 | Golly ...................... G01P 1/026 |
| 2016/0304210 A1 | 10/2016 | Wentland et al. |
| 2016/0370400 A1* | 12/2016 | Jacob ..................... G01P 5/165 |
| 2017/0052046 A1* | 2/2017 | Gordon ................... G01P 5/165 |
| 2017/0101190 A1 | 4/2017 | Anderson et al. |
| 2017/0369175 A1 | 12/2017 | Gordon et al. |
| 2018/0128849 A1* | 5/2018 | Wong ....................... G01F 1/46 |
| 2018/0259547 A1* | 9/2018 | Abdullah ................ G01P 5/165 |
| 2018/0259548 A1 | 9/2018 | Anderson et al. |
| 2020/0309808 A1* | 10/2020 | Golly ................. B23K 1/0016 |
| 2020/0393484 A1* | 12/2020 | Johnson ................. G01P 5/165 |

\* cited by examiner

PITOT TUBE HEATER ASSEMBLY

FOREIGN PRIORITY

This application claims priority to India Patent Application No. 201811037757, filed Oct. 5, 2018, and all the benefits accruing therefrom under 35 U.S.C. § 119, the contents of which in its entirety are herein incorporated by reference.

BACKGROUND

Exemplary embodiments pertain to the art of aircraft sensors such as pitot tubes, and more particularly to ice prevention and removal from such sensors.

A pitot tube is widely used to determine airspeed of an aircraft or other vehicle, or to measure air or gas velocities in industrial applications. In particular, by measuring stagnation pressure of a fluid driven into the pitot tube, together with a measured static pressure, the airspeed of the aircraft can be determined. In certain flight conditions, the pitot tube may be subject to ice accumulation from moisture in the air. For this reason, pitot tubes are equipped with heating elements to prevent such ice accumulation. Further, in other conditions, the pitot tube may ingest ice crystals which then accumulate inside of the pitot tube and cause failure in its operation. A typical pitot tube is substantially cylindrical with an internal diameter containing the heating elements, or coils to prevent ice accumulation.

BRIEF DESCRIPTION

In one embodiment, a pitot tube includes an outer tube extending from a first tube end to second tube end. The second tube end defines a tip portion of the pitot tube. A tube sleeve is located inside of the outer tube and defines a tube passage extending from the first tube end to the second tube end. A heating element is located between the outer tube and the tube sleeve. The heating element is isolated from airflow into the tube passage.

Additionally or alternatively, in this or other embodiments the tube sleeve and the outer tube are formed separately.

Additionally or alternatively, in this or other embodiments the heating element is one or more heater coils wrapped around the tube sleeve.

Additionally or alternatively, in this or other embodiments the tube sleeve includes one or more sleeve grooves in a sleeve outer surface to accommodate the heater coils.

Additionally or alternatively, in this or other embodiments one or more water dams extend from the tube sleeve into the tube passage.

Additionally or alternatively, in this or other embodiments one or more drain openings extend from the tube passage through the tube sleeve and through the outer tube.

Additionally or alternatively, in this or other embodiments the tube sleeve is secured to the outer tube via brazing.

Additionally or alternatively, in this or other embodiments the tube sleeve is formed by additive manufacturing.

In another embodiment, a method of forming a pitot tube includes installing a heating element to an outer surface of a tube sleeve, the tube sleeve defining a tube passage of the pitot tube. The tube sleeve is secured in an outer tube such that the heating element is between the tube sleeve and the outer tube and is isolated from airflow through the tube passage.

Additionally or alternatively, in this or other embodiments installing the heating element to the tube sleeve includes forming one or more sleeve grooves in the outer surface of the tube sleeve, and installing the heating element in the one or more grooves.

Additionally or alternatively, in this or other embodiments the heating element is a heater coil.

Additionally or alternatively, in this or other embodiments the tube sleeve is formed by additive manufacturing.

Additionally or alternatively, in this or other embodiments a layer of braze paste is applied to the tube sleeve prior to securing the tube sleeve into the outer tube, and the tube sleeve is secured to the outer tube via brazing.

Additionally or alternatively, in this or other embodiments one or more drain openings are formed in the pitot tube, extending from the tube passage through the tube sleeve and through the outer tube for egress of fluid from the tube passage.

Additionally or alternatively, in this or other embodiments a tip portion of the pitot tube is plugged after securing the tube sleeve to the outer tube, and a selected tip profile shape is formed in the tip portion.

Additionally or alternatively, in this or other embodiments the selected tip profile shape is formed by machining.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
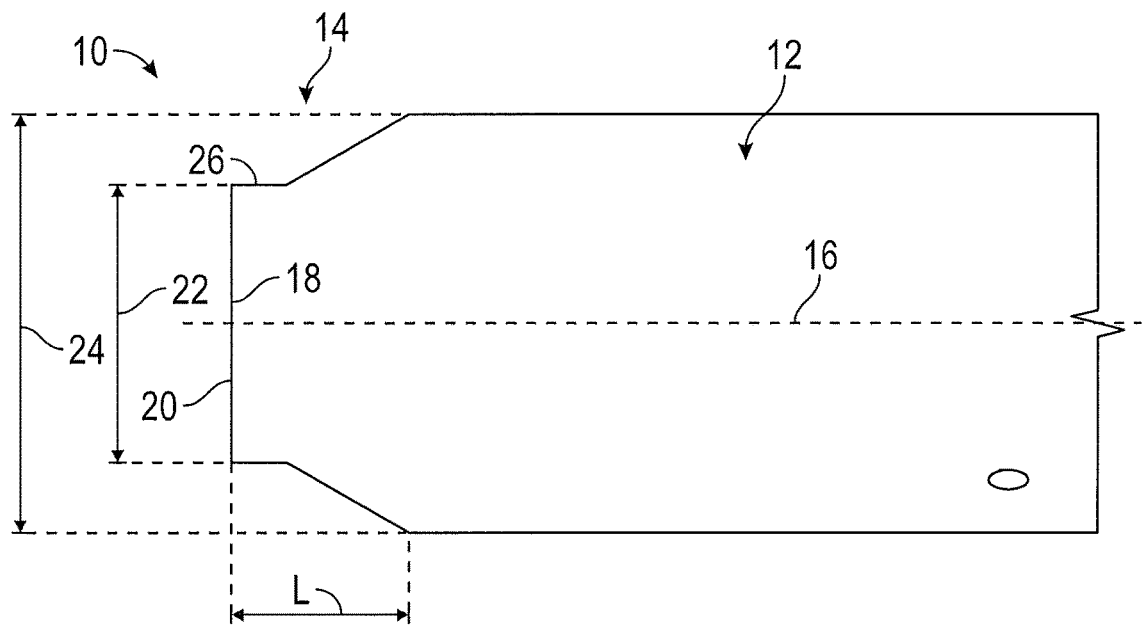
FIG. 1 is a perspective view of an embodiment of a pitot tube.

Referring to FIG. 1, illustrated is an embodiment of a sensor, in this embodiment a pitot tube 10. The pitot tube 10 includes a cylindrical body portion 12 and a tip portion 14 extending along a tube axis 16 from the body portion 12 toward a tube inlet 18. In the embodiment of FIG. 1, the tip portion 14 includes an inlet opening 20 having an inlet diameter 22 smaller than a body diameter 24 of the body portion 12. The tip portion 14, between the body portion 12 and the inlet opening 20, tapers in diameter along a concave curve 26. In some embodiments, the concave curve 26 does not extend entirely to the inlet opening 20 as the inlet diameter 22 extends axially from the inlet opening 20 to the concave curve 26. It shall be understood that the curve 26 may be straight or a profile that is aerodynamically suitable in one embodiment.

As shown, the tip portion 14 has a tip length L. The length of the tip may be limited by an ability of a heating element or coils disposed inside the tip to provide heat to it. That is, if the tip is too long, the heater may not be able to heat a distal end thereof such that ice does not form or otherwise accumulate in or on the tip 14.

Figure 2:
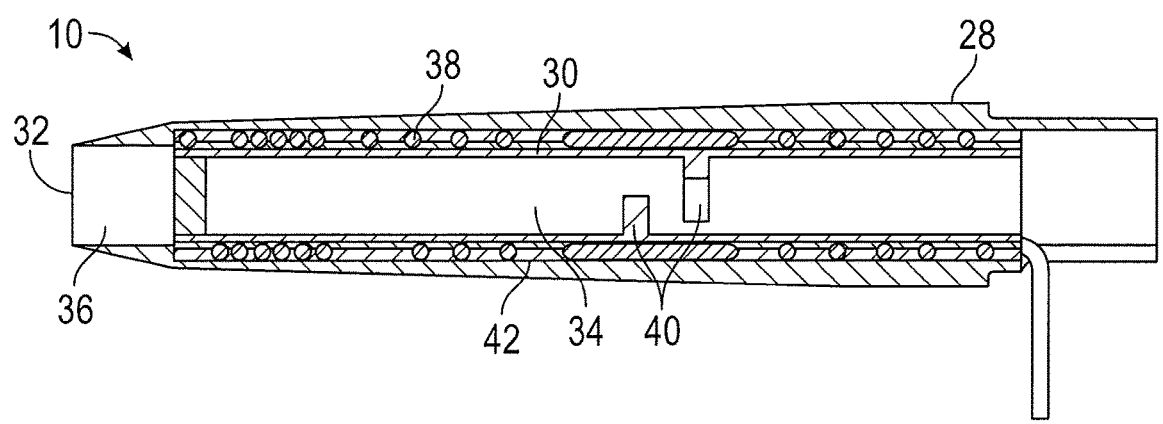
FIG. 2 is a cross-sectional view of an embodiment of a pitot tube.

Referring now to FIG. 2, the pitot tube 10 includes an outer tube 28 and a tube sleeve 30 disposed inside of the outer tube 28. The tube sleeve 30 extends along an interior of the pitot tube 10 to a tube end 32, defining a tube passage 34 from a tip portion 36 of the pitot tube 10 to the tube end 32. A heater coil 38 is disposed radially between the tube sleeve 30 and the outer tube 28. The pitot tube 10 further includes one or more water dams 40 extending inwardly from the tube sleeve 30 into the tube passage 34 and one or more drain openings 42 extending from the tube passage 34, through the tube sleeve 30 and the outer tube 28 to allow for egress of water from the pitot tube 10.

The structure and a method of forming the pitot tube 10 will be further described below with reference to the flow diagram of FIG. 3 and to FIGS. 4-13. At block 300 of FIG. 3, the tube sleeve 30 is formed, in some embodiments by additive manufacturing, or by other suitable methods. The tube sleeve 30 is formed from a metallic material, such as a Nickel alloy, or other suitable metallic material.

Figure 4:
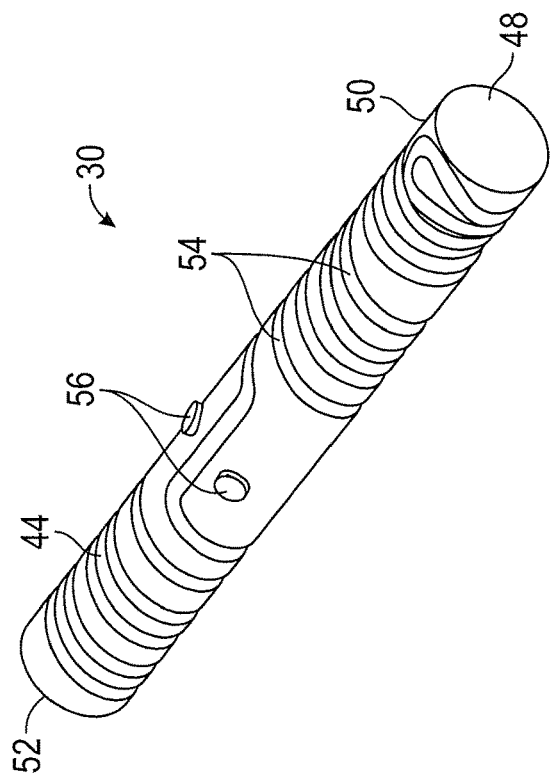
FIG. 4 is a cross-sectional view of an embodiment of a tube sleeve of a pitot tube.
Figure 5:
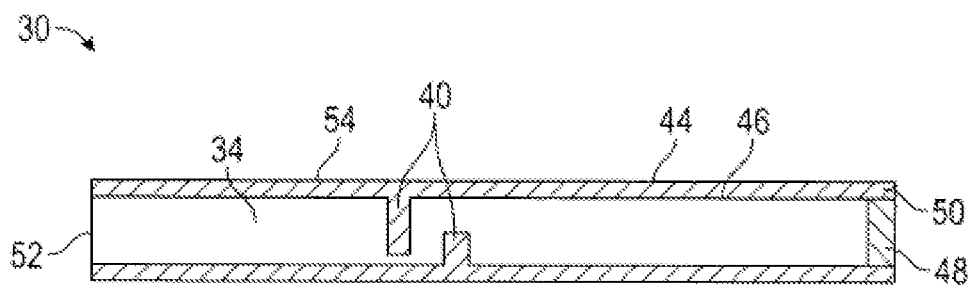
FIG. 5 is another cross-sectional view of an embodiment of a tube sleeve of a pitot tube.

As illustrated in FIGS. 4 and 5, the tube sleeve 30 includes a sleeve outer surface 44 and a sleeve inner surface 46. The sleeve inner surface 46 defines the tube passage 34 and the one or more water dams 40 extend from the sleeve inner surface 46 into the tube passage 34. The tube sleeve 30 includes a sleeve wall 48 at a first sleeve end 50 that closes the tube passage 34 at the first sleeve end 50, and is open at a second sleeve end 52 opposite the first sleeve end 50. The tube sleeve 30 further includes one or more sleeve grooves 54 formed in the sleeve outer surface 44 to receive the heater coil 38. Additionally, protrusions 56 extend outwardly from the sleeve outer surface 44 corresponding to locations of the drain openings 42 in the completed pitot tube 10.

Figure 3:
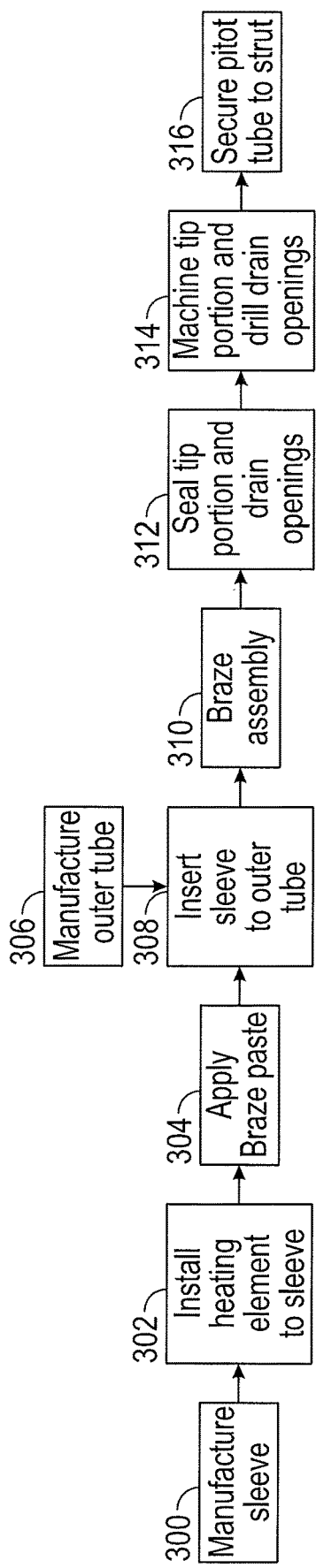
FIG. 3 is a schematic illustration of a method of making an embodiment of a pitot tube.
Figure 6:
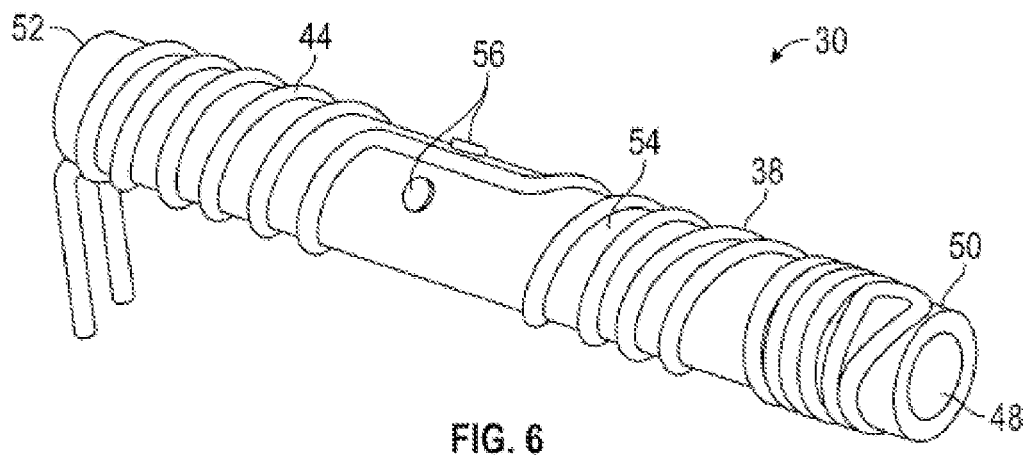
FIG. 6 is an illustration of installation of a heater coil to an embodiment of a tube sleeve.
Figure 7:
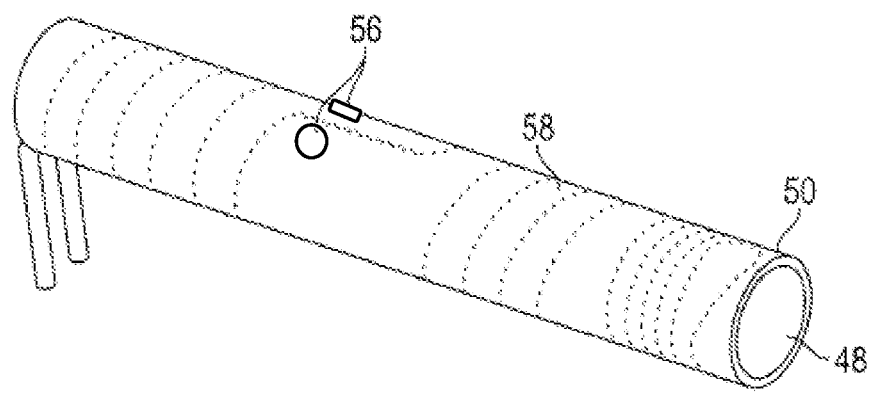
FIG. 7 is a perspective view of an embodiment of a tube sleeve having a layer of braze paste applied thereto.

In block 302 of FIG. 3, the heater coil 38 is wound onto the tube sleeve 30 by inserting the heater coil 38 into the sleeve grooves 54, as shown in FIG. 6. In block 304 of FIG. 3, and as shown in FIG. 7, a layer of braze paste 58 is applied to the sleeve outer surface 44, covering the heater coil 38, leaving the protrusions 56, however, uncovered by the braze paste 58.

Figure 8:
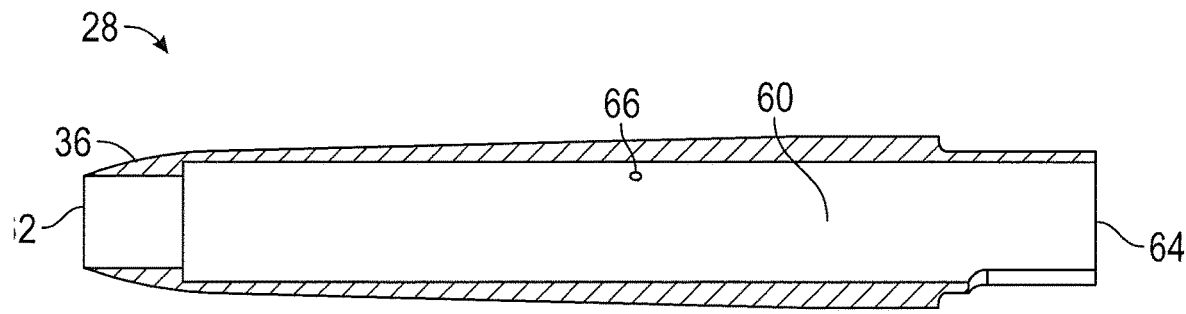
FIG. 8 is a schematic view of an embodiment of an outer tube of a pitot tube.

In block 306 and as shown in FIG. 8, the outer tube 28 is formed, having a through opening 60 extending from a first outer tube end 62 nearest the tip portion 36 to a second outer tube end 64. The outer tube 28 further includes pre-drilled openings 66 extending through the outer tube 28. The pre-drilled openings 66 are located at the drain opening 42 locations in the pitot tube 10, but are oversized, compared to the finished drain openings 42.

Figure 9:
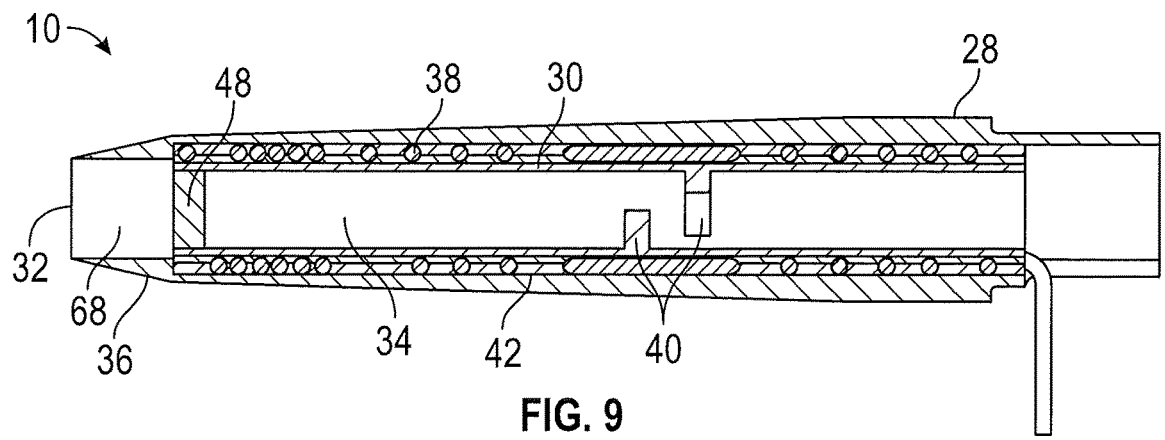
FIG. 9 is a schematic illustration of installation of a tube sleeve into an outer tube of the pitot tube.
Figure 10:
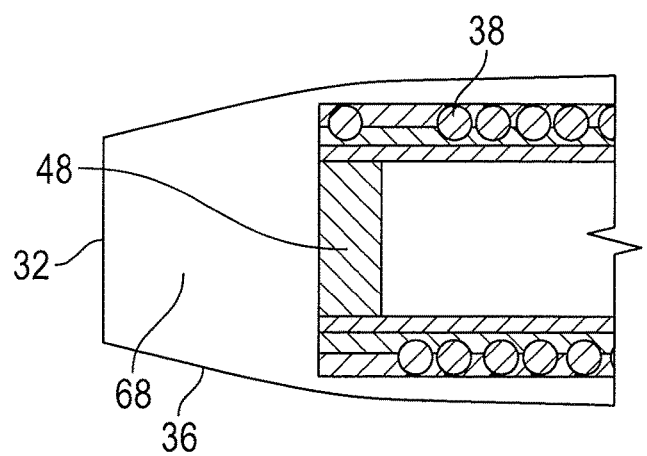
FIG. 10 is an illustration of filling of the tip cavity during assembly of the pitot tube.
Figure 11:
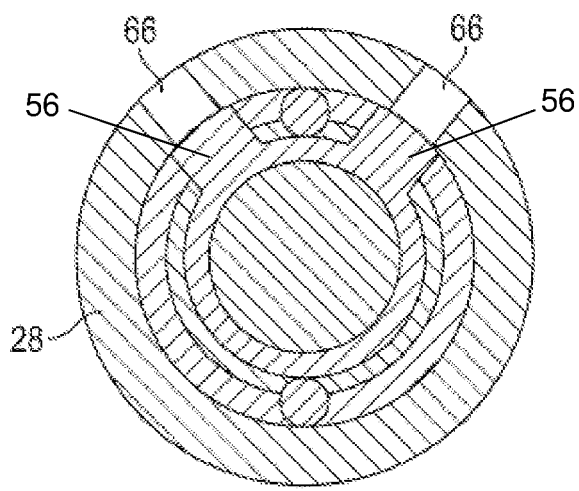
FIG. 11 is an illustration of filling of pre-drilled openings during manufacture of the pitot tube.
Figure 12:
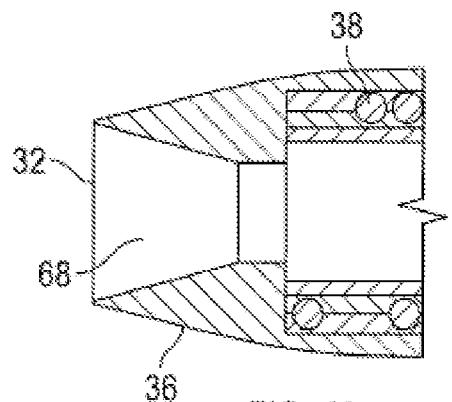
FIG. 12 is a schematic illustration of an embodiment of a completed tip portion of a pitot tube.
Figure 13:
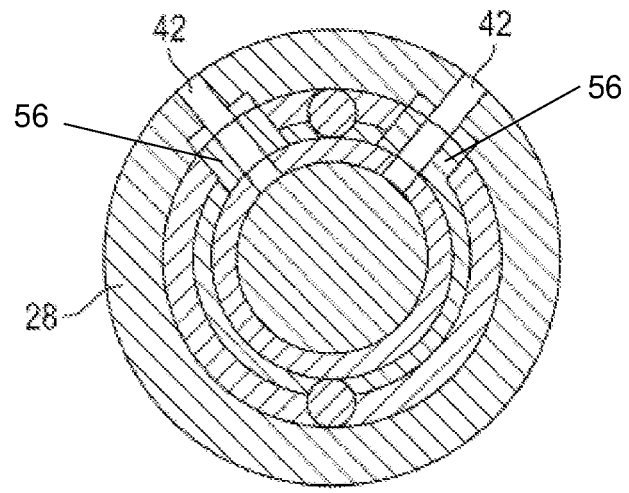
FIG. 13 is a schematic illustration of completed drain openings of a pitot tube.

In block 308, and as shown in FIG. 9, the tube sleeve 30 is inserted into the outer tube 28, and the protrusions 56 are aligned with the pre-drilled openings 66. The tube sleeve 30 is inserted such that the sleeve wall 48 is located closest to the tip portion 36, thereby defining a tip cavity 68 between the sleeve wall 48 and the tip portion 36. At step 310, the tube sleeve 30/outer tube 28 assembly is brazed in, for example, a vacuum furnace. At step 312, and referring to FIGS. 10 and 11, the predrilled openings 66 and the tip cavity 68 are filled by, for example, a laser metal deposition process, and at step 314 a selected pitot tube tip profile 70 is formed in the filled tip cavity 68 by as illustrated in FIG. 12 by, for example, machining operations, and the drain openings 42 are drilled through the filled pre-drilled openings 66 and through the protrusions 46 as illustrated in FIG. 13. At block 316, the pitot tube 10 is then brazed or otherwise secured to a pitot tube strut (not shown).

The pitot tube 10 configuration disclosed herein allows for flexibility in material choices and manufacturing method of the separate outer tube 28 and tube sleeve 30 to enhance performance of the pitot tube 10. Separate fabrication of the outer tube 28 and the tube sleeve 30 simplifies manufacturing of the pitot tube 10, thereby reducing pitot tube 10 cost. Further, the configuration encloses the heater coil 38, thereby protecting the heater coil 38 from damage or corrosion due to moisture exposure in the tube passage 34. Adding the grooves to the tube sleeve 30 aids in winding of the heater coil 38, improving the accuracy and repeatability thereof, and improves pitot tube 10 performance with consistent heater coil 38 application.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pitot tube, comprising:
   an outer tube extending from a first tube end to second tube end, the second tube end defining a tip portion of the pitot tube;
   a tube sleeve inside of the outer tube defining a tube passage extending from the first tube end to the second tube end;
   a heating element between the outer tube and the tube sleeve, the heating element being isolated from airflow into the tube passage;

a layer of braze paste applied to the tube sleeve, covering the heating element; and one or more drain openings extending from the tube passage radially outwardly through the tube sleeve and through the outer tube, the one or more drain openings extending through one or more radially outwardly extending protrusions formed in the tube sleeve;

wherein the layer of braze paste applied to the tube sleeve covers the heating element and leaves the one or more protrusions uncovered by the layer of braze paste.

2. The pitot tube of claim 1, wherein the tube sleeve and the outer tube are formed separately.

3. The pitot tube of claim 1, wherein the heating element is one or more heater coils wrapped around the tube sleeve.

4. The pitot tube of claim 3, wherein the tube sleeve includes one or more sleeve grooves in a sleeve outer surface to accommodate the heater coils.

5. The pitot tube of claim 1, further comprising one or more water dams extending from the tube sleeve into the tube passage.

6. The pitot tube of claim 1, wherein the tube sleeve is secured to the outer tube via brazing.

7. The pitot tube of claim 1, wherein the tube sleeve is formed by additive manufacturing.

\* \* \* \* \*